Patented Sept. 24, 1929

1,728,948

UNITED STATES PATENT OFFICE

WILLIAM H. WAGGAMAN AND HENRY W. EASTERWOOD, OF CHICAGO HEIGHTS, ILLINOIS, ASSIGNORS TO VICTOR CHEMICAL WORKS, OF CHICAGO, ILLINOIS, A CORPORATION OF ILLINOIS

PHOSPHORUS PRODUCTION

No Drawing.   Application filed January 17, 1924.   Serial No. 686,891.

Our invention relates more particularly to a new and improved furnace charge for use in the production of phosphorus and phosphoric acid and to a process adapted for use with such charge to produce phosphorus and phosphoric acid efficiently by the pyrolytic method. It relates particularly to a process of bringing about the evolution of phosphorus from mineral phosphates more expeditiously and cheaply than has heretofore been accomplished, and makes it possible to effect the desired chemical reactions in a much simpler and less costly apparatus than any heretofore employed.

In carrying out this process it is proposed to heat a charge in suitable kilns of the general types employed in burning limestone and cement, so designed that the raw materials may be fed continuously in at one end of the kiln and the burned or spent residue discharged at the other end. The charge comprises a briquetted charge consisting of a mixture of finely ground phosphatic maeral, coke or other solid reducing agent with an amount of silica sufficiently low to prevent the mass from fusing at the temperatures attained in said kilns.

It is a well known fact that in heating mixtures of phosphate rock, silica and a reducing agent to temperatures ranging from 1300 degrees to 1600 degrees C. that a reaction takes place wherein phosphorus is evolved and the lime thus freed combines with the silica present to form fusible silicates of calcium. The phosphorus may be collected as such or subsequently oxidized to $P_2O_5$ and collected as phosphoric acid either in water or a solution of phosphoric acid, or may be passed into a Cottrell electric precipitator where it is recovered as strong phosphoric acid in a manner well understood.

On account of the fusible nature of the lime silicates ordinarily obtained it is necessary in order to make this process continuous, to produce a very fluid slag which can be readily tapped from the furnace. Temperatures higher than necessary for the reaction therefore must frequently be employed in order to insure the ready removal of the slag or residue. This method therefore has heretofore entailed a considerable waste of heat energy and the use of either an electric furnace or gas tight fuel furnace of the blast furnace type, which are not only expensive to install, but require a great deal of engineering skill to operate.

In such methods it is necessary to provide excessive amount of silica in order to produce the fluid slag, and the provision of this excess silica is in itself a source of expense. This silica in the charge also reduces the proportion of phosphorus in the charge and thus requires the handling and heating of greater charge quantities for a given production of phosphorus. Reduction in the silica used, therefore, reduces both the cost of materials and the cost of operation.

We have found however, that phosphorus may also be driven off from mixtures of mineral phosphates, a reducing agent and silica, where the quantity of the latter ingredient present is much lower than that required to completely convert the lime of the phosphatic material into any definite calcium silicate. Moreover, where the silica contained in such a charge is relatively low a difficultly fusible residue or sintered mass is obtained at the temperatures required to bring about the complete or substantially complete evolution of phosphorus. This solid residue or sinter may be readily discharged from the exit end of the kiln practically free from phosphoric acid, while fresh material is continuously introduced at the intake end of the kiln.

Of the commonly known calcium silicates the one which contains the highest proportion of lime to silica is calcium ortho-silicate ($Ca_2SiO_4$) in which the ratio of lime to silica is 1.86 to 1. The melting point of this silicate according to Forsythe (The Blast Furnace and the Mfr. of Pig Iron) is 1460 degrees C.

In actual practise we propose to employ a finely ground intimate mixture of coke or other carbonaceous material as a reducing agent and a natural phosphate containing silica or to which silica is added so that the proportions of lime to silica in the final mixture are one of $SiO_2$ to two or more of CaO. By the use of such proportions no readily fusible calcium silicates are formed and no fluid slag is produced at temperatures up to approximately 1500 degrees C. To this mixture a binder may be added if necessary and the mass molded or pressed into briquettes in some well known manner. With certain natural materials available for this purpose, clay or other plastic materials are present as impurities in sufficient quantities to act as a binder. With other materials it may be necessary to add binding material such as sulphite pitch or starch.

These briquettes are then charged into a kiln of some standard type and heated either by mixing solid fuel therewith and introducing air for its combustion, or by burning solid, liquid or gaseous fuel which is introduced into the kiln from an outside source. Care is taken that the temperature is kept below 1500 degrees C. and preferably between 1300 degrees and 1450 degrees C. The phosphorus evolved from the briquetted charge is then either led off through a suitable flue and collected under reducing conditions as elemental phosphorus, or oxidized to $P_2O_5$ either by admission of air into the furnace or by introducing air or oxidizing gases into a chamber outside of the furnace proper. The unfused or sintered residue is continuously removed either by hand or some mechanical means at or near the discharge end of the kiln and a fresh charge continuously fed into the intake end of the kiln.

With the briquetted charge proportioned as herein stated temperatures up to approximately 1500 degrees C. may be used without producing a fused slag. The temperatures below 1500 degrees C. are entirely adequate to cause substantially complete evolution of phosphorus and the sintered residue can be readily continuously removed.

While we have described our charge and process as carried out in one type of kiln, it may obviously be carried out in other apparatus adapted for the provision of the desired temperature and for the removal of the sintered residue.

We claim:

1. The process of producing phosphorus and compounds of phosphorus which consists in heating in continuous rotary kilns briquetted mixtures of natural phosphates, silica, and a solid reducing agent, the temperature of the kiln not exceeding approximately 1500° C., said constituents being so proportioned that they do not form a readily fusible residue when the temperature has been raised to approximately 1500 degrees C.

2. The process of producing phosphorus and compounds of phosphorus from mixtures of finely ground natural phosphates, silica and a solid reducing agent in which silica and lime are present in the proportion of one part of silica ($SiO_2$) to two or more parts or lime (CaO), by driving off the phorphorus or compounds of phosphorus by means of heat not exceeding approximately 1500° C. and collecting said phosphorus and phosphorus compounds.

3. The process of producing phosphorus and compounds of phosphorus from briquetted mixtures of finely ground natural phosphates, silica and a solid reducing agent in which mixtures the ratio of silica to lime is less than one to two, and heating said briquetted mixtures to a temperature exceeding 1300 degrees C. and not exceeding 1500 degrees C. thereby driving off phosphorus and compounds of phosphorus.

Signed at Chicago Heights, Cook County, Illinois, this 14th day of January, 1924.

WILLIAM H. WAGGAMAN.
HENRY W. EASTERWOOD.